(12) United States Patent
Melittas

(10) Patent No.: US 6,865,819 B2
(45) Date of Patent: Mar. 15, 2005

(54) PRINTING DEVICE FOR INSTALLING GEM ELECTRICAL OUTLET BOX

(75) Inventor: William Melittas, Roslyn, NY (US)

(73) Assignee: Gem Temp, LLC, Roslyn, NY (US)

( * ) Notice: Subject to any disclaimer, the term of this patent is extended or adjusted under 35 U.S.C. 154(b) by 0 days.

(21) Appl. No.: 10/453,697

(22) Filed: Jun. 3, 2003

(65) Prior Publication Data

US 2004/0244212 A1 Dec. 9, 2004

(51) Int. Cl.$^7$ .............................................. G01B 5/00
(52) U.S. Cl. .................... 33/528; 33/DIG. 10
(58) Field of Search .................. 33/528, DIG. 10; 101/405, 333; 40/328

(56) References Cited

U.S. PATENT DOCUMENTS

| | | | |
|---|---|---|---|
| 2,908,416 A | 10/1959 | Rudolph et al. | |
| 3,745,664 A | 7/1973 | Altseimer | 33/DIG. 10 |
| 3,832,947 A | 9/1974 | Funahashi | 101/405 |
| 3,913,235 A | 10/1975 | Tenneson et al. | 33/DIG. 10 |
| 4,392,425 A | 7/1983 | Capezzuto et al. | 101/405 |
| 4,589,211 A | 5/1986 | Policka | 33/DIG. 10 |
| 4,793,069 A * | 12/1988 | McDowell | 33/528 |
| 4,888,880 A | 12/1989 | Parker | |
| 5,014,617 A | 5/1991 | Lesyk | |
| 5,111,593 A * | 5/1992 | Gehen, Sr. | 33/613 |
| 5,111,745 A * | 5/1992 | Wilson | 101/333 |
| 5,157,844 A | 10/1992 | Mallison et al. | |
| 5,195,249 A | 3/1993 | Jackson | |
| 5,222,303 A | 6/1993 | Jardine | |
| 5,357,683 A | 10/1994 | Trevino | |
| 5,377,599 A * | 1/1995 | Wall et al. | 101/327 |
| 5,438,929 A * | 8/1995 | Wong et al. | 101/405 |
| 5,615,490 A | 4/1997 | Burcheii | |
| 5,692,357 A | 12/1997 | McCain | |
| 5,813,130 A | 9/1998 | MacDowell | 33/528 |
| 6,047,639 A | 4/2000 | Shih | 101/333 |
| 6,095,046 A | 8/2000 | Lookholder et al. | |
| 6,101,731 A | 8/2000 | Mesa | |
| 6,209,214 B1 | 4/2001 | Talavera | 33/528 |
| 6,223,445 B1 | 5/2001 | Schuette, Jr. et al. | |
| 6,226,882 B1 | 5/2001 | Barr | 33/528 |
| 6,233,838 B1 | 5/2001 | Falwell et al. | |
| 6,289,806 B2 | 9/2001 | Hirano | 101/333 |
| 6,434,848 B1 * | 8/2002 | Gordon et al. | 33/528 |

* cited by examiner

*Primary Examiner*—Christopher W. Fulton
(74) *Attorney, Agent, or Firm*—Hoffman & Baron, LLP (57) ABSTRACT

The present invention is a device for printing an outline of an opening to be cut in a wall to facilitate the installation of a GEM electrical box in the wall. The outline is substantially rectangular having a first and second set of sides. The first set of sides is shorter than the second set of sides and includes a semi-oval portion located at the middle of each side. The second set of sides have a semi-oval portion located at the end of each side. The device includes a rubberstamp configured to print the outline on the wall, and also includes a handle and a pair of levels for locating (leveling) the device prior to imprinting the outline on the wall. The rubberstamp can includes an inking means for replenishing ink to the rubberstamp. The device can also include a spring assembly so that the rubberstamp can initially be located at a position on the wall without imprinting the outline on the wall, but will print the outline on the wall upon the application of pressure to the rubberstamp.

27 Claims, 10 Drawing Sheets

PRINTING DEVICE FOR INSTALLING GEM ELECTRICAL OUTLET BOX

BACKGROUND OF THE INVENTION

The present invention relates generally to a printing device. More particularly, the present invention is directed to a printing device for marking an outline of an opening to be cut in a wall for installing a GEM electrical outlet box in the wall.

The installation of an electrical outlet box in an existing wall generally requires an electrician to hold the box against the wall while leveling the box with a level to trace the exterior perimeter of the electrical outlet box on the wall. The electrician then cuts the opening in the wall based upon the tracing of the electrical outlet box. The openings that result through the practice of tracing the electrical outlet box generally do not provide a clean fit and generally must be trimmed further to accommodate the electrical outlet box. This requires additional time and effort by the electrician.

Accordingly, devices have been developed for facilitating the marking of an outline for cutting an opening to install an electrical outlet box in a wall. Many of the devices known in the prior art are configured to address new construction where the electrical outlet boxes are initially installed to the wall framing (studs) prior to the installation of the sheet rock. These devices are configured to print the outline on the back face of the panel and are configured to be attached to the outlet box during printing. (See U.S. Pat. Nos.: Pat. Nos.: 6,226,882; 6,101,731; 4,589,211; 3,913,235; and 3,745,664;). Other devices are configured to address situations where the sheet rock is already in place and an outlet box is now being added to an existing room.(See U.S. Pat. Nos.: 6,223,445; 6,209,214; 5,813,130; 5,615,490; and 5,222,303).

U.S. Pat. No. 5,813,130 to MacDowell and U.S. Pat. No. 6,209,214 to Talayera disclose templates having a pair of levels for drawing the outline of an opening to be cut in a wall. In particular, the '130 patent to MacDowell includes a plate, and first and second levels. The plate is formed with an opening configured to conform with a GEM electrical box outlet. The first level is mounted to the plate for horizontal leveling of the template while the second level is mounted to the plate for providing vertical leveling of the template. Similarly the '214 patent to Talayera includes a base and at least one level for positioning the template. The shape of the base is generally configured to conform with a GEM electrical box. The devices disclosed in both the MacDowell and Talayera patents requires the user to utilize a separate marking instrument, e.g., pen or pencil, for marking the outline on the wall. Accordingly, the user must use two hands for marking the outline on the wall.

U.S. Pat. No. 6,223,445 to Schuette, Jr., et al. discloses a device and method for installing and supporting an electrical outlet box. The device is very similar to the template tool disclosed in the Talayera patent in that the template tool includes a base with a level. The perimeter of the base in the '445 Schuette, Jr., et al. patent however is substantially rectangular. That is, the perimeter does not take into account the actual perimeter of a GEM electrical outlet box.

U.S. Pat. No. 6,226,882 to Barr discloses a device for marking an outline on a sheet of material for defining a portion of the material to be cut out. The device includes a rubberstamp configured to print the outline of the material to be cut out on the interior side of a sheet of drywall. The device is configured to be mounted to an outlet box that is already installed and includes a rubberstamp and a spring loaded contact pad. The contact pad is configured to prevent the inadvertent marking of the wall prior to the application of sufficient pressure to engage the rubberstamp.

U.S. Pat. No. 3,745,664 to Altseimer discloses an apparatus for marking the blind side of a drywall panel for cutting a hole for an electrical outlet box. The apparatus is used in construction when the drywall is being installed after the electrical outlet box has been attached to a stud. The apparatus includes a stamp for marking the outline of the electrical outlet box and a plurality of legs for engaging the outlet box.

U.S. Pat. No. 3,913,235 to Tenneson et al. discloses an apparatus for marking an outline of an opening on a panel to be installed over an electrical outlet box. The apparatus includes a stamp having a rectangular shape and a plurality of projections that are configured to cooperate with the electrical outlet box to hold the stamp in place while marking the blind side of the panel.

U.S. Pat. No. 5,222,303 to Jardine discloses a template for marking the location of junction boxes. The template includes a plate formed with an aperture and generally includes a leveling means. The aperture is configured to be the shape of a junction box or other electrical device receptacle while the leveling means is generally a pair of bubble-type levels.

U.S. Pat. No. 6,101,731 to Mesa discloses a system for locating an opening to be cut in new drywall panels that are installed after the electrical outlets. In the system, a plurality of pins for penetrating the drywall are initially attached to the outlet box which is already mounted to the stud framing. During the installation of the drywall, the pins penetrate the drywall to define the region of the drywall to be cut out.

U.S. Pat. No. 4,589,211 to Policka discloses a paneling template for marking the position of an electrical outlet box on the backside of a wall panel. The template includes a rectangular base with four felt tipped posts that extend outwardly from the corners of the base.

Each of the methods and apparatus described above has inherent shortcomings, and it is an object of the present invention to overcome such shortcomings and to provide a device for facilitating the printing of an outline of an opening to be cut in the wall for installing a GEM electrical box.

SUMMARY OF THE INVENTION

The present invention is a printing device for marking an outline of an opening to be cut in a wall for installing a GEM electrical outlet box in the wall. The printing device includes a housing, a stamp body, and at least a first level. The stamp body is connected to the housing and has a face configured to print the outline for cutting the opening in the wall. The first level is attached to the housing. Preferably the housing includes a frame, a piston body, and a spring assembly. The frame is formed with an opening defined by a boundary and includes a stop. The frame has a base for initial placement of the housing against the wall prior to printing the outline. The piston body supports the stamp body and has a shape formed to cooperate with the boundary so that the piston body can be reciprocated within the opening. The spring assembly is configured to bias the piston body against the stop in the absence of pressure and to allow the piston body to translate towards the base for printing the outline when pressure is applied to the piston body. The first level can be attached to either the frame or the piston body.

In a preferred embodiment of the invention, the face preferably defines a substantially rectangular perimeter with a plurality of semi-circle portions where the perimeter includes a first side, a second side, a third side, and a fourth side. Preferably the printing device includes a second level attached to the housing where the first level is arranged for leveling at least one of the first side and the second side, and the second level is arranged for leveling at least one of the third side and the fourth side. Preferably a handle is connected to the housing, and the housing is formed with a reservoir for storing ink with the stamp body being in fluid communication with the reservoir. Preferably the reservoir is formed in the piston body. Preferably an ink storage block is located within the reservoir.

In an alternative embodiment of the invention, the printing device includes a housing, a stamp body, and at least a first level. The stamp body has a face configured to print an outline on the wall for cutting the opening in the wall. The housing is configured to carry the stamp body for actuation between a first holding position wherein the stamp body is retained for arrangement against the wall without marking the wall, and second marking position wherein the face of the stamp body is permitted to contact the wall whereby the outline is marked on the wall. The at least one level is fixed on one of the housing and the stamp body for arranging the stamp body in relationship to one of two planar axes of the wall.

In another alternative embodiment of the invention, the printing device includes a handle and a stamp body. The handle is configured for single-handed operation. The stamp body is connected to the handle and has a face configured to print the outline. The face defines a substantially rectangular perimeter with a plurality of semi-circle portions associated with the GEM electrical box. The perimeter includes a first side, a second side, a third side, and a fourth side.

In yet another alternative embodiment of the invention, the printing device is a stamp body. The stamp body has a face configured to print an outline for cutting the opening in the wall. The face defines a substantially rectangular perimeter which includes a first side, a second side, a third side, and a fourth side. The first side has a first end, a second end, a first middle, and a first length. The first side is formed with a first semi-circle portion at the first middle. The second side has a third end, a fourth end, a second middle, and a second length. The second side is formed with a second semi-circle portion at the second middle, and the second length is equal to the first length. The third side has a fifth end, a sixth end, and a third length. The third side is formed with a third semi-circle portion at the fifth end which is connected to the third end, and the sixth end is connected to the first end. The fourth side has a seventh end, an eighth end, and a fourth length which is equal to the third length. The fourth side is formed with a fourth semi-circle portion at the eighth end with the seventh end being connected to the fourth end and the eighth end being connected to the second end. Preferably the perimeter also includes a first and second circular-segment portions. The first circular-segment portion is located between the sixth end and the third semi-circle portion while the second circular-segment portion is located between the seventh end and the fourth semi-circle portion.

For a better understanding of the present invention, reference is made to the following description to be taken in conjunction with the accompanying drawings and its scope will be pointed out in the appended claims.

BRIEF DESCRIPTION OF THE DRAWINGS

Preferred embodiments of the invention have been chosen for purposes of illustration and description and are shown in the accompanying drawings, wherein.

DETAILED DESCRIPTION OF THE INVENTION

Figure 1:
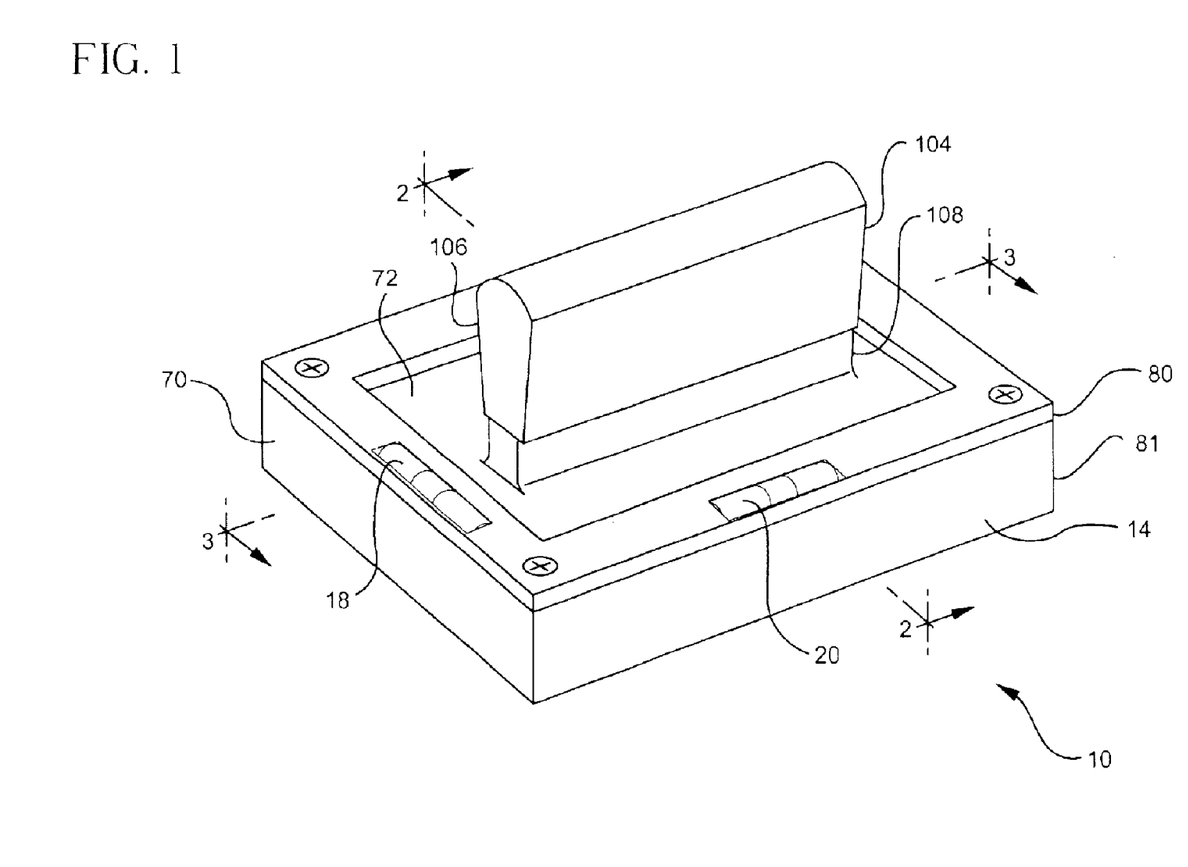
FIG. 1 is a perspective view of a printing device for marking an outline of an opening to be cut in the wall for installing a GEM electrical outlet box in accordance with the present invention.

Referring initially to FIG. 1, the present invention is a printing device 10 for marking an outline 12 of an opening to be cut in a wall for installing a GEM electrical outlet box in the wall. As used herein, the terms "GEM electrical outlet box" refers to an electrical outlet box that is used for remodeling work and alterations where the sheetrock (drywall) or plaster are already installed. That is, the installation of a "GEM electrical outlet box" contemplates that the opening will be cut into an existing wall.

Figure 2:
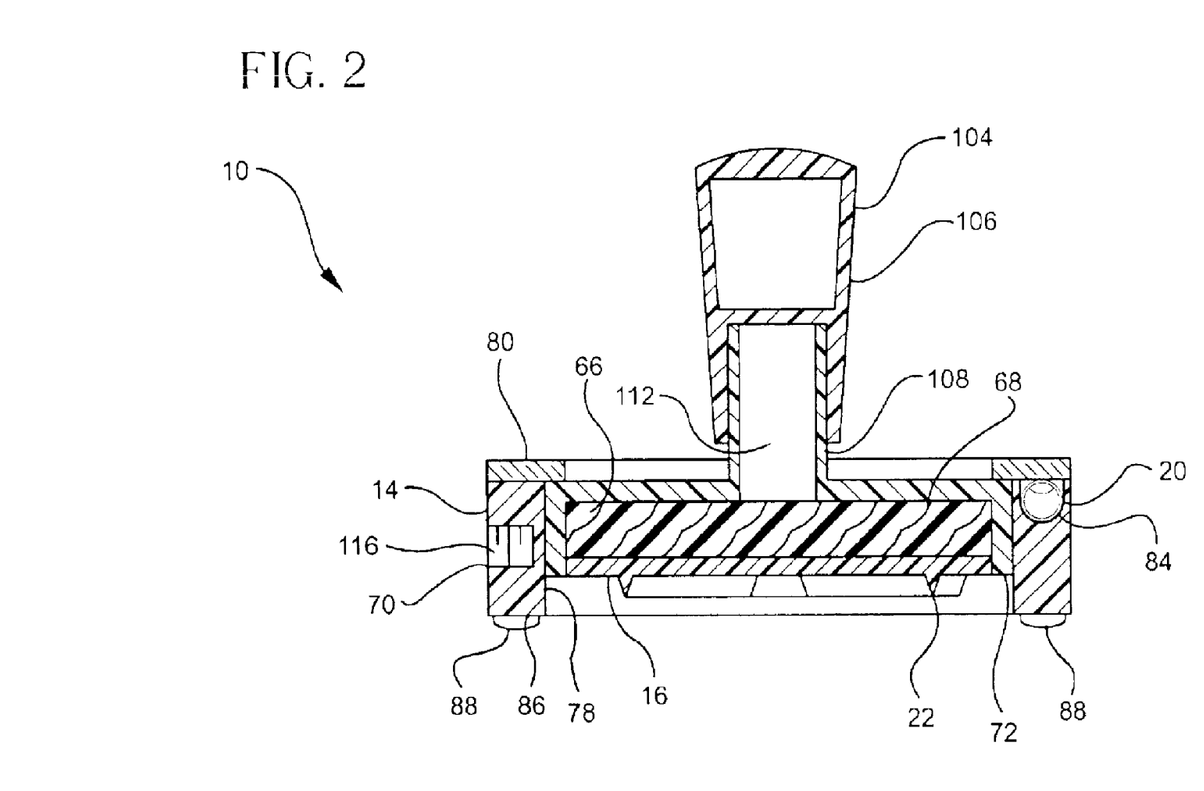
FIG. 2 is a sectional view taken along line 2—2 of the printing device shown in FIG. 1.
Figure 4:
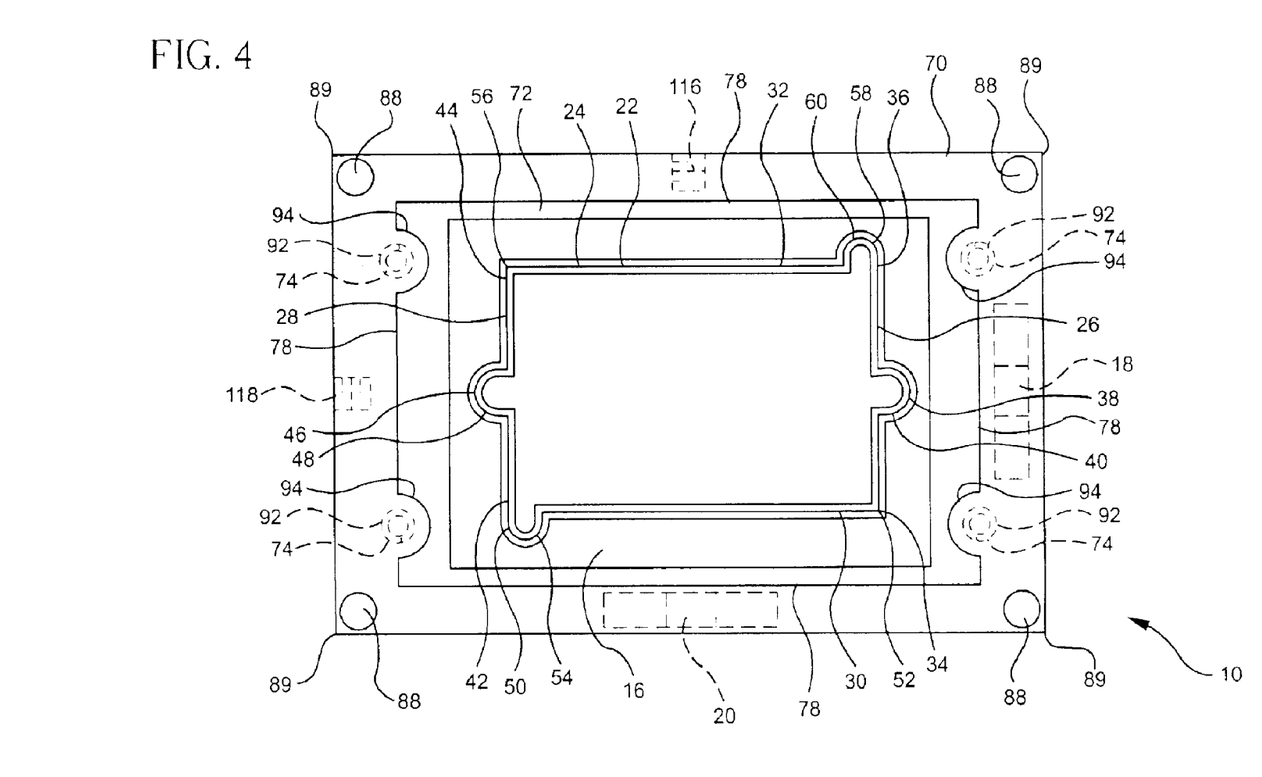
FIG. 4 is a bottom plan view of the printing device shown in FIG. 1 illustrating a first preferred embodiment of a face on a stamp body.

Referring to FIGS. 1, 2, and 4, the printing device 10 generally includes a housing 14, a stamp body 16, and at least one level 18, 20. The stamp body 16 has a face 22 configured to print the outline 12 for cutting the opening in the wall. The housing 14 is preferably configured to carry the stamp body 16 for actuation between a first holding position wherein the stamp body 16 is retained for arrangement against the wall without marking the wall, and second marking position where the face 22 of the stamp body 16 is permitted to contact the wall to print the outline 12 on the wall. At least one level 18, 20 is preferably fixed on either the housing 14 or the stamp body 16 for arranging the stamp body 16 in relationship to one of two planar axes of the wall.

Figure 5:
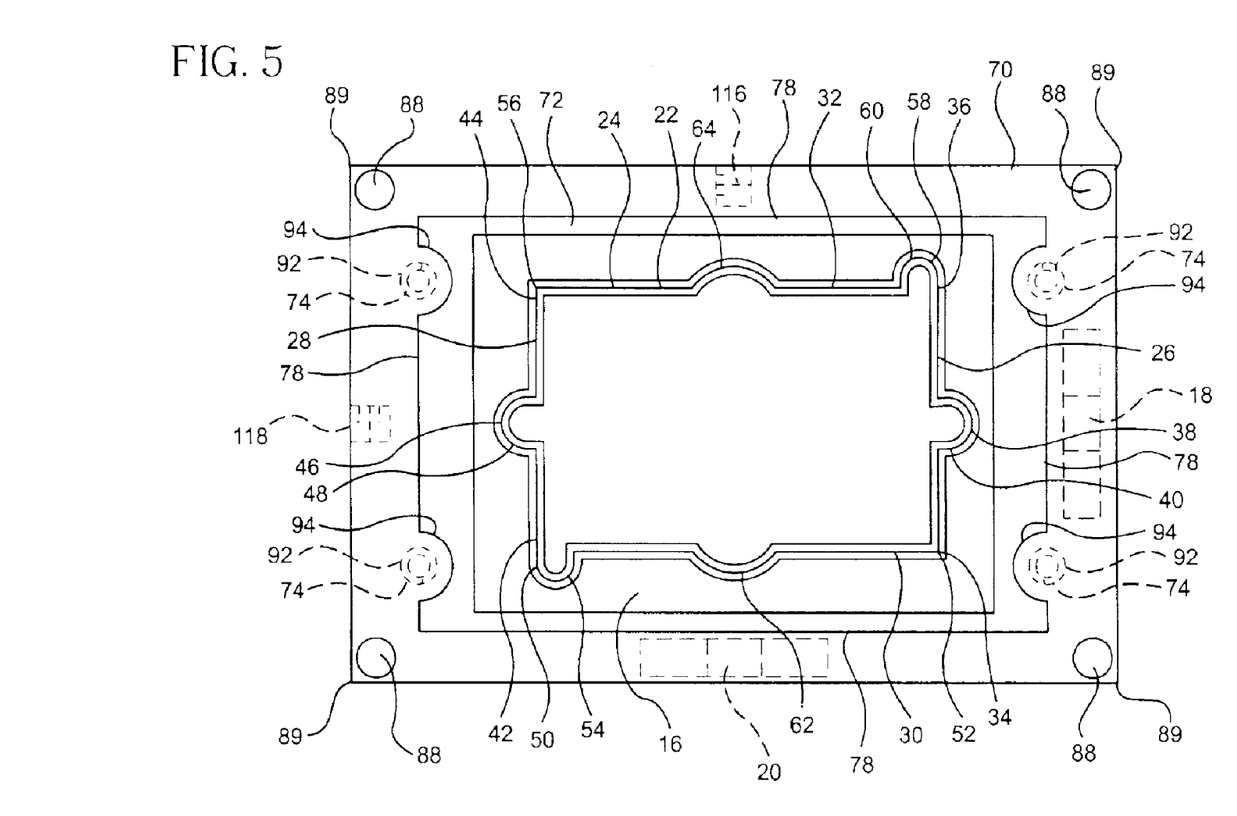
FIG. 5 is a bottom plan view of the printing device shown in FIG. 1 illustrating a second embodiment of a face on a stamp body.
Figure 6:
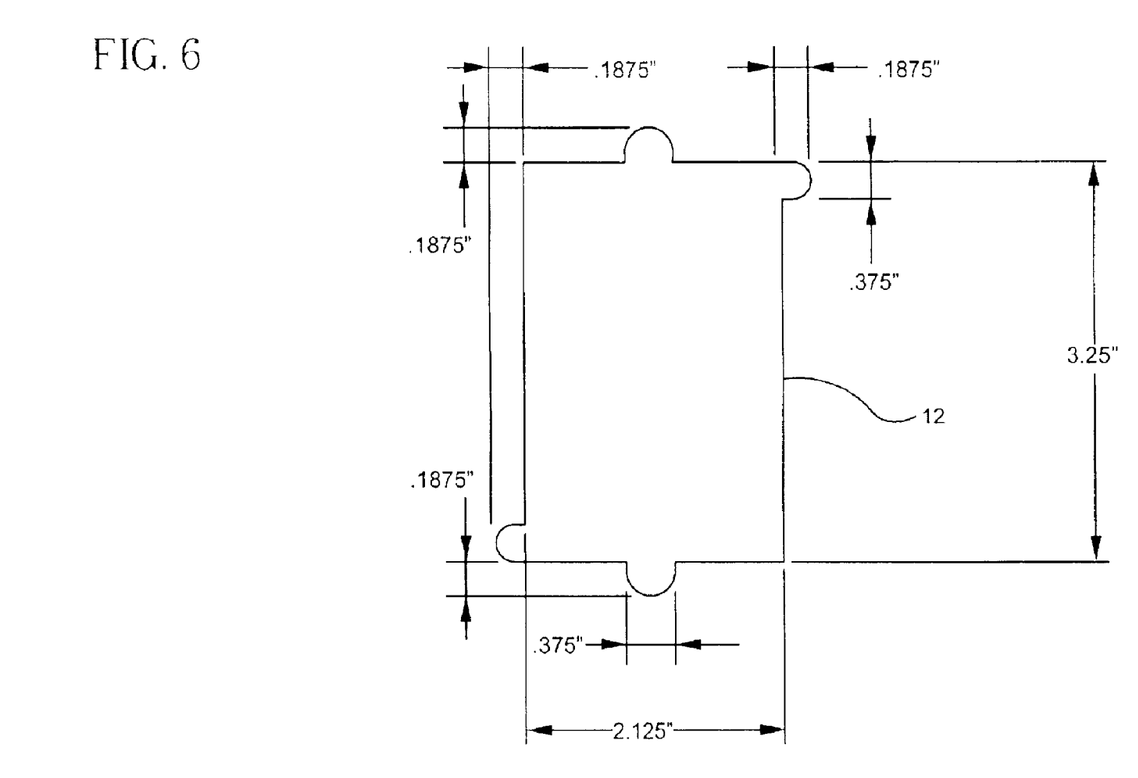
FIG. 6 illustrates an outline printed on a wall by the stamp body shown in FIG. 4.
Figure 7:
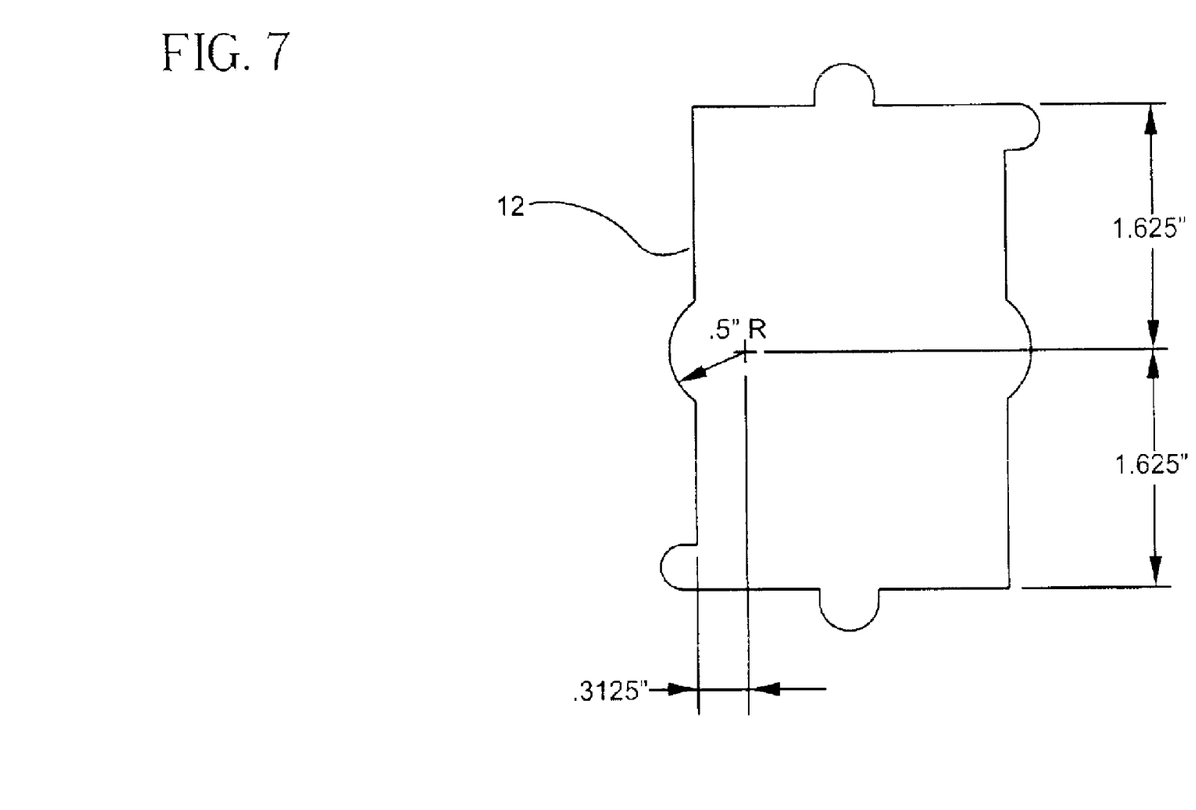
FIG. 7 illustrates an outline printed on a wall by the stamp body shown in FIG. 5.

Referring now to FIG. 4, the stamp body 16 is preferably formed with a face 22 that defines a substantially rectangular perimeter 24 with a plurality of semi-circle portions 40, 48, 54, and 60 to print the outline 12 shown in FIG. 6. The plurality of semi-circle portions 40, 48, 54, and 60 are associated with the geometry of the GEM electrical outlet box. Preferably the perimeter 24 includes a first side 26, a second side 28, a third side 30, and a fourth side 32. The first side 26 has a first end 34, a second end 36, a first middle 38, and a first length. The first side 26 is preferably formed with a first semi-circle portion 40 at the first middle 38. The second side 28 has a third end 42, a fourth end 44, a second middle 46, and a second length. The second side 28 is preferably formed with a second semi-circle portion 48 at the second middle 46, and the second length is preferably equal to the first length. The third side 30 has a fifth end 50, a sixth end 52, and a third length. The third side 30 is preferably formed with a third semi-circle portion 54 at the fifth end 50 which is connected to the third end 42, and the sixth end 52 is connected to the first end 34. The fourth side 32 has a seventh end 56, an eighth end 58, and a fourth length which is preferably equal to the third length. The fourth side 32 is preferably formed with a fourth semi-circle portion 60 at the eighth end 58 with the seventh end 56 being connected to the fourth end 44 and the eighth end 58 being connected to the second end 36. In the second embodiment shown in FIG. 5, the face 22 can be configured with a perimeter 24 that also includes a first and second circular-segment portions 62, 64 to print the outline 12 as shown in FIG. 7. The second embodiment is particularly useful for installing GEM electrical boxes of the type disclosed in U.S. Pat. No. 2,908,416 to N. H. Rudolph et al. (which is incorporated herein by reference) and is currently manufactured by Raco of South Bend Indiana. Preferably the first circular-segment portion 62 is located between the sixth end 52 and the third semi-circle portion 54 while the second circular-segment portion 64 is located between the seventh end 56 and the fourth semi-circle portion 60. Although FIGS. 6 and 7 illustrate preferred dimensions for the printed outlines 12 in inches, the precise dimensions for a face 22 of a stamp body 16 will be selected to suit the particular requirements for each specific GEM electrical outlet box.

Referring now to FIG. 2, the stamp body 16 is preferably made from any suitable material known to those skilled in the art which cooperates with a refillable ink storage reservoir 66. Suitable materials for making the stamp body 16 generally include a porous rubber matrix or a polyethylene foam. The printing device 10 preferably includes a storage block 68 located in the reservoir 66 for storing the ink. The ink storage block 68 is also preferably made of a suitable porous rubber or polyethylene foam material positioned in fluid communication with the stamp body 16 to replenish ink to the face 22 of the stamp body 16. Although the preferred embodiment of the invention contemplates that the device 10 will use a stamp body that cooperates with the reservoir 66, the stamp body 16 can also be formed in any traditional manner for making ink stamps. That is, the stamp body 16 can be made of rubber, felt or other suitable material for use in conjunction with a traditional ink pad (not shown).

Referring now to FIGS. 1 through 4, the housing 14 preferably includes a frame 70, piston body 72, and a spring assembly 74. The frame 70 is formed with an opening 76 defined by a boundary 78 and includes a stop 80. The frame 70 is preferably formed as two separate parts including the stop 80 and a base portion 81 that are fastened together to contain the piston body 72 and the spring assembly 74. In the preferred embodiment, the base portion 81 forms the opening 76 defined by the boundary 78, and the stop 80 is either glued or fastened to the base portion 81 with suitable fasteners such as screws as shown in FIG. 1. The frame 70 is preferably made from a clear plastic to allow the user to view the wall during use. The frame 70 is preferably formed with at least one recess 84 below the stop 80 for receiving a level 18, 20. The frame 70 has a base 86 for initial placement of the housing 14 against the wall prior to printing the outline 12. Preferably rubber feet 86 are provided at the corners 89 of the base 86 so that the base 86 will not slip with respect to the wall once the user positions the device 10 in the desired location.

Referring to FIGS. 1, 2, and 4, the piston body 72 supports the stamp body 16 and has a shape formed to cooperate with the boundary 78 so that the piston body 72 can be reciprocated within the opening 76. The spring assembly 74 is configured to bias the piston body 72 against the stop 80 in the absence of pressure and to allow the piston body 72 to translate towards the base 86 for printing the outline 12 when pressure is applied to the piston body 72.

Figure 3:
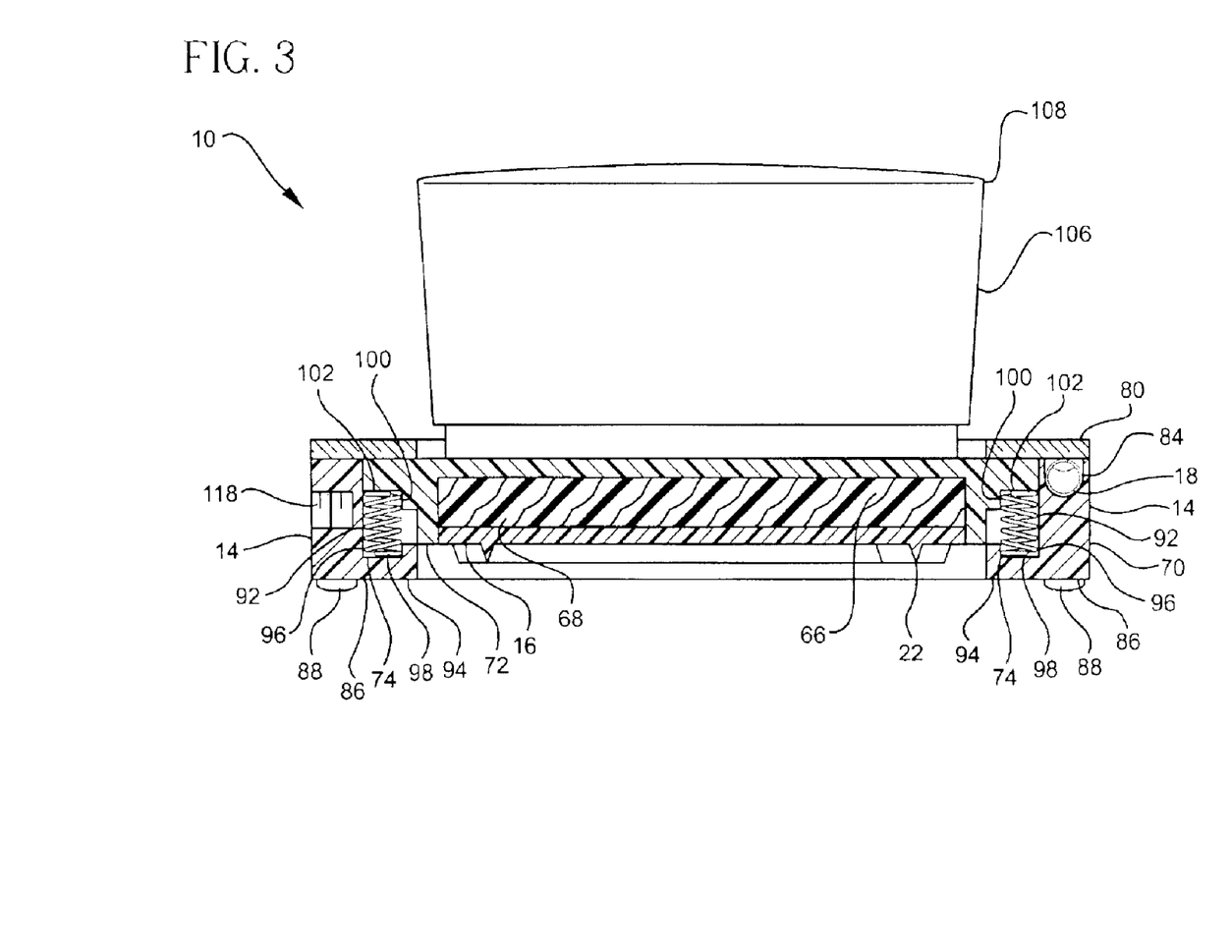
FIG. 3 is a sectional view taken along line 3—3 of the printing device shown in FIG. 1.

Referring now to FIGS. 1 through 3, the printing device 10 preferably includes first and second levels 18, 20 located on the frame 70 of the housing 14. The first level 18 is preferably arranged for leveling at least one of the first and second sides 26, 28 of the printed outline 12 while the second level 20 is arranged for leveling at least one of the third and fourth sides 30, 32 of the printed outline 12. The levels 18, 20 can generally be spirit levels which are glass vials filled almost completely with a liquid to form a bubble. In alternative embodiments of the invention, the levels 18, 20 can be located on the piston body 72, or even directly on the stamp body 16.

Referring now to FIGS. 3 and 4, the spring assembly 74 biases the piston body 72 into a non-printing position to allow the printing device 10 to be arranged against the wall without inadvertently marking same. Once the device 10 is positioned in the desired location, a modest amount of pressure can be applied to the piston body 72 to compress the spring assembly 74 and translate the face 22 of the stamp body 16 towards the wall to mark the outline 12 on the wall. Those skilled in the art will understand that the spring assembly 74 can be configured in a variety of ways. As shown in FIGS. 3 and 4, in the preferred embodiment of the invention, the spring assembly 74 utilizes a plurality of coiled springs 92 located about the boundary 78 of the opening 76. For each coiled spring 92, the frame 70 includes a pad 94 connected at the base 86 along the boundary 78. The pad 94 is preferably formed with a recess 96 for receiving a first end 98 of the coiled spring 92. Preferably the piston body 72 is also formed with a second recess 100 for receiving the second end 102 of the coiled spring 92. As shown in FIG. 3, the coiled springs 92 bias the piston body 72 against the stop 80. The plurality of springs generally will include at least two spring located on opposite sides of the frame 70. As shown in FIG. 4, preferably the plurality of springs includes four springs as shown therein. As noted above, the spring assembly 74 could be configured in a variety of ways including those depicted in U.S. Pat. No. 6,226,882 to Barr, which is incorporated herein by reference. In addition, the spring assembly 74 could be configured in the same manner as the Xstamper Pre-inked stamps manufactured by Shachihata Inc. of Lakewood, N.J.

Referring now to FIGS. 1 through 3, the printing device 10 preferably includes a handle 104 to provide for single-handed operation. Preferably the handle 104 is configured to provide access to the reservoir 66 and the storage block 68 for replenishing ink therein. The handle 104 can generally be formed to include a cap portion 106 and a port 108. The port 108 is defined by walls that are in fluid communication with an opening 76 formed in the top of the stamp body 16. The cap portion 106 is configured to cooperate with the port 108 to removably seal the opening 76 into the reservoir 66. In an alternative embodiment (not shown), the handle can be U-shaped and separate port with cap can be provided to allow a user to replenish the reservoir 66. In another alternative embodiment that uses an ink pad as described above, the handle 104 can be attached directly to the stamp body 16.

Figure 8:
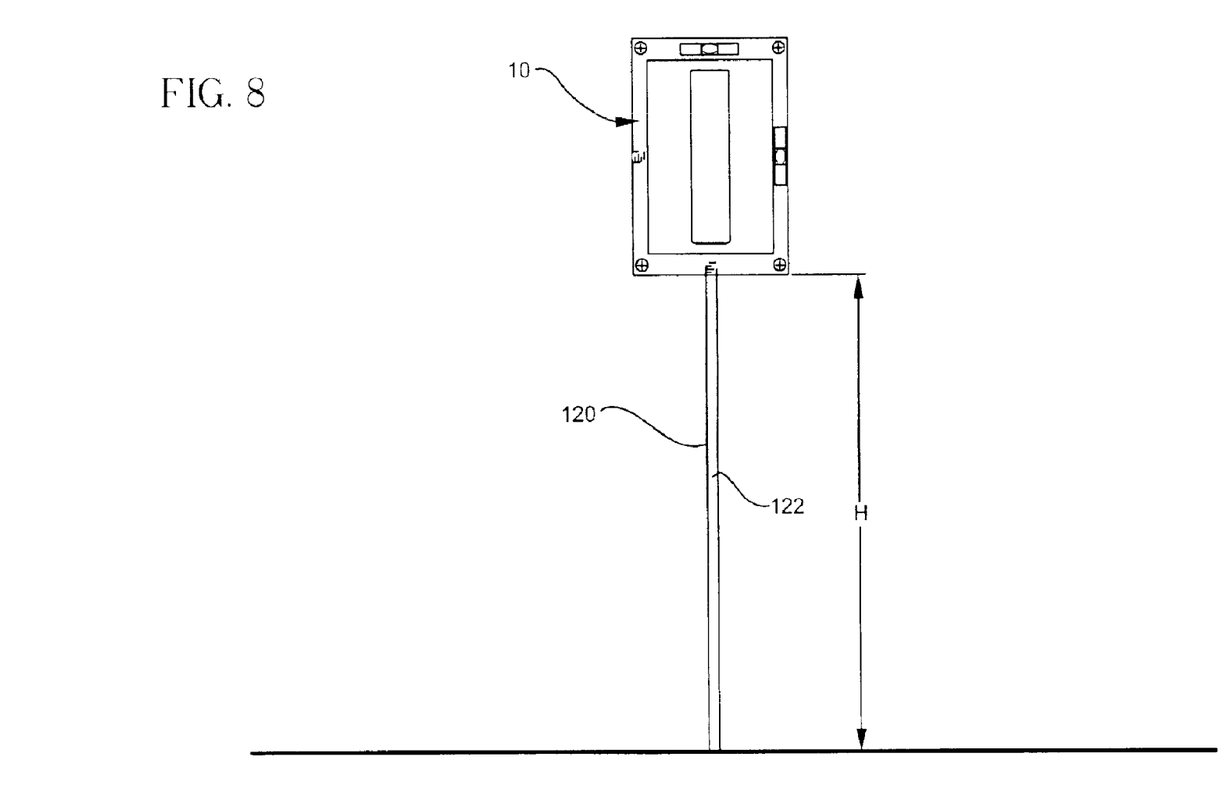
FIG. 8 is an elevational view of the printing device including a calibrated pole for positioning the face of the stamp body with respect to a floor.
Figure 9:
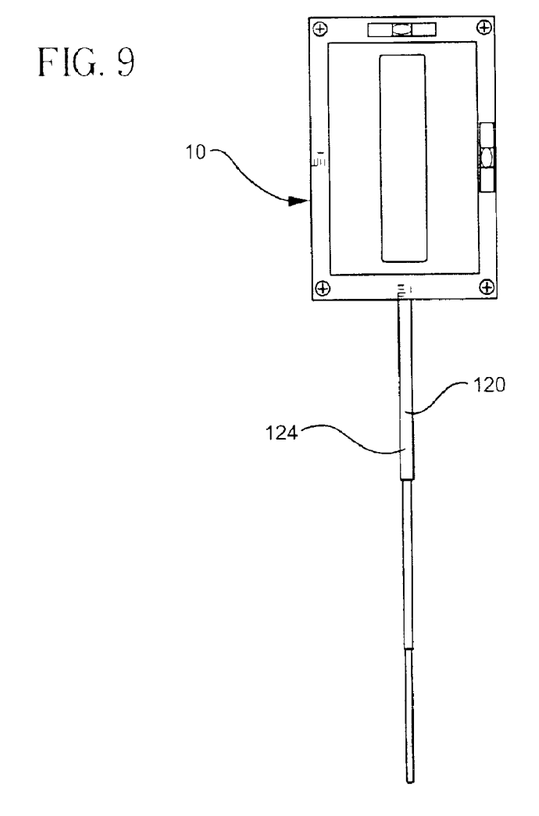
FIG. 9 is an elevational view of the printing device including an adjustable telescoping rod for positioning the face of the stamp body with respect to a floor.
Figure 10:
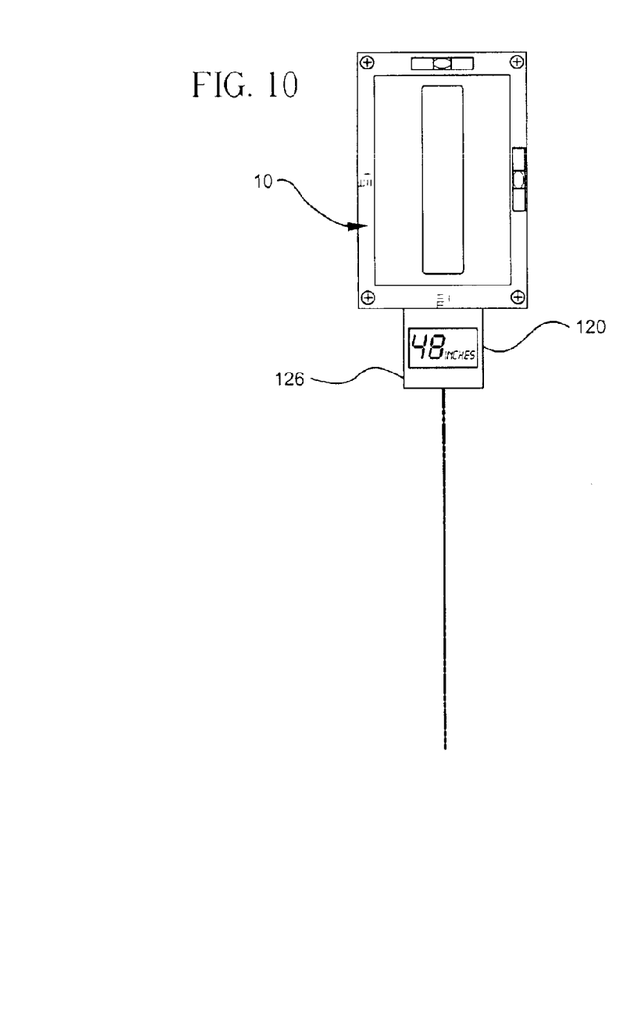
FIG. 10 is an elevational view of the printing device including an electronic distance measuring device for positioning the face of the stamp body with respect to a floor.
Figure 11:
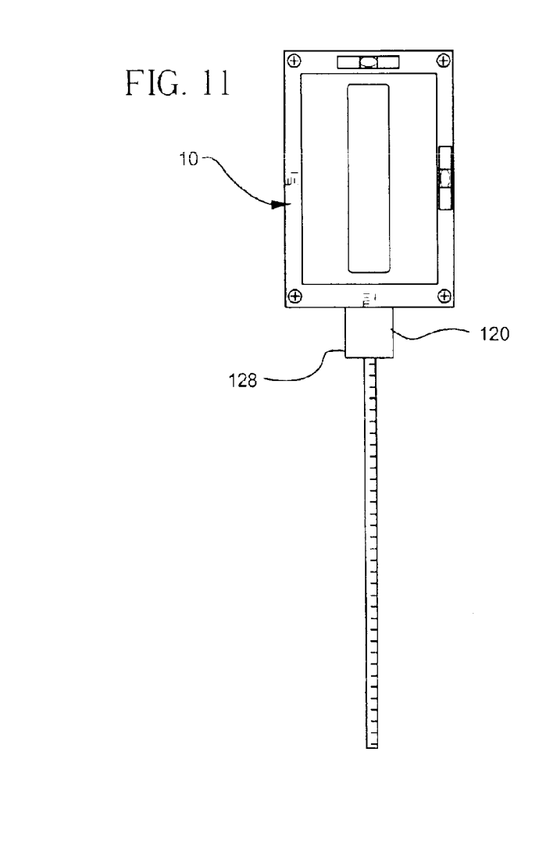
FIG. 11 is an elevational view of the printing device including a tape measure for positioning the face of the stamp body with respect to a floor.

In a preferred embodiment of the invention, the printing device 10 includes a measuring device 120 for positioning the face 22 of the stamp body 16 at a height H with respect to the floor as shown in FIG. 8. The height H varies based upon the type of device that is installed in the GEM electrical outlet box, but is generally selected so that a light switch will be centered at about 48 inches above the floor and outlets will be centered at about 14 inches above the floor. Referring to FIGS. 8 through 11, the measuring device 120 can include: a calibrated pole 122; an adjustable telescoping rod 124; an electronic distance measuring device 126; a tape measure 128, or any other suitable means for measuring or calibrating a distance. Although not required, the measuring device 120 is preferably connected to the printing device 10. Referring now to FIGS. 2 through 5 and 8 through 10, the frame 70 of the housing14 is preferably provided with a pair of threaded bores 116, 118 for facilitating the connection of the measuring device 120.

Thus, while there have been described what are presently believed to be the preferred embodiments of the invention, those skilled in the art will realize that changes and modifications may be made thereto without departing from the spirit of the invention, and is intended to claim all such changes and modifications as fall within the true scope of the invention.

What is claimed is:

1. A printing device for marking an outline of an opening to be cut in a wall for installing a GEM electrical outlet box in the wall, said printing device comprising:

a housing having a frame having a base for initial placement of said housing against the wall prior to printing the outline thereon and a stop, said frame being formed with an opening defined by a boundary;

a handle connected to said housing;

a stamp body connected to said housing having a face configured to print an outline for cutting an opening in a wall;

a piston body for supporting said stamp body and having a shape formed to cooperate with said boundary so that said piston can be reciprocated within said opening;

a spring assembly configured to bias said piston against said stop in the absence of pressure and to allow said piston body to translate towards said base for printing the outline when pressure is applied to said piston body; and at least a first level attached to said housing.

2. A printing device as defined in claim 1, wherein said face defines a substantially rectangular perimeter with a plurality of semi-circle portions, said perimeter including a first side, a second side, a third side, and a fourth side.

3. A printing device as defined in claim 2, further comprising a second level attached to said housing;

wherein said first level is arranged for leveling one of said first side and said second side, and said second level is arranged for leveling one of said third side and said fourth side.

4. A printing device as defined in claim 1, wherein said housing is formed with a reservoir for storing ink, said stamp body being in fluid communication with said reservoir.

5. A printing device as defined in claim 4, further comprising an ink storage block located within said reservoir.

6. A printing device as defined in claim 1, wherein said first level is attached to said frame.

7. A printing device as defined in claim 1, wherein said first level is attached to said piston body.

8. A printing device as defined in claim 1, wherein said piston body is formed with a reservoir for storing ink, said stamp body being in fluid communication with said reservoir.

9. A printing device as defined in claim 8, further comprising an ink storage block located within said reservoir.

10. A printing device as defined in claim 1, further comprising a measuring device attached to said housing for positioning said face at a height with respect to a floor.

11. A printing device as defined in claim 1, wherein said measuring device is a calibrated pole.

12. A printing device as defined in claim 1, wherein said measuring device is an adjustable telescoping rod.

13. A printing device as defined in claim 1, wherein said measuring device is an electronic distance measuring device.

14. A printing device as defined in claim 1, wherein said measuring device is a tape measure.

15. A printing device for marking an outline for cutting an opening in a wall comprising:

a stamp body having a face configured to print an outline on a wall for cutting an opening in said wall;

a housing which carries said stamp body for actuation between i) a holding position wherein said stamp body is retained for arrangement against said wall without marking said wall, and ii) a marking position wherein said face of said stamp body is permitted to contact said wall whereby said outline is marked on said wall;

a handle connected to said housing; and at least one level fixed on one of said housing and said stamp body for arranging said stamp body in relationship to one of two planar axes of said wall.

16. A printing device as defined in claim 15, wherein said face defines a substantially rectangular perimeter with a plurality of semi-circle portions, said perimeter including a first side, a second side, a third side, and a fourth side.

17. A printing device as defined in claim 16, further comprising a second level attached to said housing;

wherein said first level is arranged for leveling one of said first side and said second side, and said second level is arranged for leveling one of said third side and said fourth side.

18. A printing device as defined in claim 15, wherein said housing is formed with a reservoir for storing ink, said stamp body being in fluid communication with said reservoir.

19. A printing device as defined in claim 18, further comprising an ink storage block located within said reservoir.

20. A printing device as defined in claim 15, wherein said housing comprises:

a frame having a base for initial placement of said housing against the wall prior to printing the outline thereon and a stop, said frame being formed with an opening defined by a boundary a piston body for supporting said stamp body and having a shape formed to cooperate with said boundary so that said piston can be reciprocated within said opening; and a spring assembly configured to bias said piston body against said stop in the absence of pressure and to allow said piston body to translate towards said base for printing the outline in the presence of pressure applied to said piston body.

21. A printing device for marking an outline of an opening to be cut in a wall for installing a GEM electrical outlet box in the wall, said printing device comprising:

a handle configured for single-handed operation;

a stamp body connected to said handle having a face configured to print the outline, said face defining a substantially rectangular perimeter with a plurality of semi-circle portions associated with the GEM electrical box, said perimeter including a first side, a second side, a third side, and a fourth side; and at least a first level attached to said stamp body for leveling one of said sides.

22. A printing device as defined in claim 21, further comprising a second level attached to said stamp body;

wherein said first level is arranged for leveling one of said first side and said second side, and said second level is arranged for leveling one of said third side and said fourth side.

23. A printing device for marking an outline of an opening to be cut in a wall, said printing device comprising:

a stamp body having a face configured to print an outline for cutting an opening in a wall, said face defining a substantially rectangular perimeter, said perimeter including:

a first side having a first end, a second end, a first middle, and a first length, said first side being formed with a first semi-circle portion at said first middle;

a second side having a third end, a fourth end, a second middle, and a second length, said second side being formed with a second semi-circle portion at said second middle, said second length being equal to said first length;

a third side having a fifth end, a sixth end, and a third length, said third side being formed with a third semi-circle portion at said fifth end, said fifth end being connected to said third end, said sixth end being connected to said first end; and a fourth side having a seventh end, an eighth end, and a fourth length, said fourth side being formed with a fourth semi-circle portion at said eighth end, said seventh end being connected to said fourth end, said eighth end being connected to said second end; said fourth length being equal to said third length;

a handle connected to said stamp body; and at least a first spirit level attached to said printing device for leveling one of said sides.

24. A printing device as defined in claim 23, further comprising a housing connected between said stamp body and said handle.

25. A printing device as defined in claim 24, wherein said housing is formed with a reservoir for storing ink, said stamp body being in fluid communication with said reservoir.

26. A printing device as defined in claim 25, further comprising an ink storage block located within said reservoir.

27. A printing device as defined in claim 23, wherein said perimeter further comprises:

a first circular-segment portion located between said sixth end and said third semi-circle portion; and a second circular-segment portion located between said seventh end and said fourth semi-circle portion.

* * * * *